US012252673B2

(12) United States Patent
Watson et al.

(10) Patent No.: US 12,252,673 B2
(45) **Date of Patent: *Mar. 18, 2025**

(54) CONCENTRATED GLASS CLEANING COMPOSITIONS IN UNIT DOSE PACKETS OR POUCHES

(71) Applicant: Korex Canada Company, Etobicoke (CA)

(72) Inventors: Douglas Robert Watson, Toronto (CA); Sanford Pensler, Grosse Pointe Park, MI (US)

(73) Assignee: KOREX CANADA COMPANY, Ontario (CA)

( * ) Notice: Subject to any disclaimer, the term of this patent is extended or adjusted under 35 U.S.C. 154(b) by 223 days.

This patent is subject to a terminal disclaimer.

(21) Appl. No.: 17/155,202

(22) Filed: Jan. 22, 2021

(65) Prior Publication Data

US 2021/0230519 A1 Jul. 29, 2021

Related U.S. Application Data

(60) Provisional application No. 62/964,790, filed on Jan. 23, 2020.

(51) Int. Cl.

| | |
|---|---|
| ***C11D 1/75*** | (2006.01) |
| ***C11D 1/14*** | (2006.01) |
| ***C11D 1/29*** | (2006.01) |
| ***C11D 3/00*** | (2006.01) |
| ***C11D 3/04*** | (2006.01) |
| ***C11D 3/20*** | (2006.01) |
| ***C11D 3/26*** | (2006.01) |
| ***C11D 3/28*** | (2006.01) |
| ***C11D 3/30*** | (2006.01) |
| ***C11D 3/34*** | (2006.01) |
| ***C11D 3/37*** | (2006.01) |
| ***C11D 3/40*** | (2006.01) |
| ***C11D 3/43*** | (2006.01) |
| ***C11D 3/44*** | (2006.01) |
| ***C11D 3/50*** | (2006.01) |
| ***C11D 11/00*** | (2006.01) |
| ***C11D 17/00*** | (2006.01) |
| ***C11D 17/04*** | (2006.01) |
| ***C11D 17/08*** | (2006.01) |

(52) U.S. Cl.

CPC ................ *C11D 3/50* (2013.01); *C11D 1/146* (2013.01); *C11D 1/29* (2013.01); *C11D 1/75* (2013.01); *C11D 3/0047* (2013.01); *C11D 3/044* (2013.01); *C11D 3/046* (2013.01); *C11D 3/2065* (2013.01); *C11D 3/2068* (2013.01); *C11D 3/26* (2013.01); *C11D 3/30* (2013.01); *C11D 3/3481* (2013.01); *C11D 3/349* (2013.01); *C11D 3/3723* (2013.01); *C11D 3/3769* (2013.01); *C11D 3/40* (2013.01); *C11D 3/43* (2013.01); *C11D 11/0094* (2013.01); *C11D 17/0008* (2013.01); *C11D 17/042* (2013.01); *C11D 17/043* (2013.01); *C11D 2111/18* (2024.01)

(58) Field of Classification Search

CPC .. C11D 1/29; C11D 1/75; C11D 3/044; C11D 3/046; C11D 3/26; C11D 3/30; C11D 3/2065; C11D 3/2068; C11D 3/3723; C11D 3/3769; C11D 17/042

USPC ........ 510/180, 181, 182, 296, 439, 475, 477

See application file for complete search history.

(56) References Cited

U.S. PATENT DOCUMENTS

| | | | | |
|---|---|---|---|---|
| 3,696,043 | A | 10/1972 | Labarge et al. | |
| 3,939,090 | A | 2/1976 | Zmoda | |
| 3,962,152 | A * | 6/1976 | Nicol .................. | C11D 3/0036 510/528 |
| 4,242,725 | A | 12/1980 | Douma et al. | |
| 4,481,326 | A | 11/1984 | Sonenstein | |
| 4,539,145 | A | 9/1985 | Alvarez et al. | |
| 4,544,693 | A | 10/1985 | Surgant | |
| 4,692,494 | A | 9/1987 | Sonenstein | |
| 4,765,916 | A | 8/1988 | Ogar, Jr. et al. | |
| 4,801,636 | A | 1/1989 | Smith et al. | |
| 4,972,017 | A | 11/1990 | Smith et al. | |
| 5,272,191 | A | 12/1993 | Ibrahim et al. | |
| 6,153,577 | A | 11/2000 | Cripe et al. | |
| 7,008,915 | B2 * | 3/2006 | Aouad ............... | C11D 11/0094 510/451 |

(Continued)

FOREIGN PATENT DOCUMENTS

| | | | | |
|---|---|---|---|---|
| EP | 2441824 A1 * | 4/2012 | ............... | C11D 1/83 |
| EP | 3050953 A1 * | 8/2016 | ......... | C11D 17/0091 |

(Continued)

OTHER PUBLICATIONS

Aqua ChemPacs "Experience the Future of Clean" Web Page Accessed via https://www.chempacs.com/home.
Pak-It. Web Page Accessed via https://www.pakit.com/.

*Primary Examiner* — Gregory R Delcotto
(74) *Attorney, Agent, or Firm* — DINSMORE & SHOHL LLP

(57) ABSTRACT

A unit dose glass cleaner concentrate product includes from 5 grams to 50 grams of a concentrated glass cleaning composition encased in a water soluble film. The concentrated glass cleaning composition includes at least one cleaning solvent and at least one surfactant. The total weight percentage of the cleaning solvents and surfactants, expressed on an anhydrous basis, is at least 50% of the weight of the unit dose window cleaner concentrate product. The unit dose glass cleaner concentrate product can be added to a container and diluted to produce a glass cleaning solution.

20 Claims, No Drawings

(56) References Cited

U.S. PATENT DOCUMENTS

| | | | | |
|---|---|---|---|---|
| 2002/0169092 | A1 * | 11/2002 | Alexandre Catlin | C11D 3/3753 510/220 |
| 2004/0033922 | A1 * | 2/2004 | Gorlin | C11D 3/225 510/424 |
| 2005/0202996 | A1 | 9/2005 | Waits et al. | |
| 2012/0159718 | A1 * | 6/2012 | Catlin | C11D 17/045 206/525 |
| 2015/0337236 | A1 * | 11/2015 | Tang | C11D 3/2068 510/342 |
| 2015/0376556 | A1 * | 12/2015 | Ohtani | C11D 3/43 510/386 |
| 2016/0040101 | A1 * | 2/2016 | De Poortere | C11D 17/042 510/296 |
| 2017/0158994 | A1 * | 6/2017 | Letzelter | C11D 3/2079 |
| 2018/0105770 | A1 * | 4/2018 | Acikalin | C11D 1/8255 |
| 2018/0334641 | A1 * | 11/2018 | Piorkowski | C11D 3/43 |
| 2019/0048296 | A1 * | 2/2019 | Pirokowski | C11D 3/43 |
| 2019/0177664 | A1 | 6/2019 | Hansen et al. | |
| 2019/0233784 | A1 * | 8/2019 | Sivik | C11D 17/042 |
| 2021/0155875 | A1 * | 5/2021 | Sun | C11D 3/2075 |

FOREIGN PATENT DOCUMENTS

| | | | | |
|---|---|---|---|---|
| EP | 3050955 | A1 * | 8/2016 | C11D 1/75 |
| EP | 3279301 | A1 * | 2/2018 | B65D 85/808 |
| EP | 3279307 | A1 * | 2/2018 | |
| EP | 3517598 | A1 * | 7/2019 | C11D 1/83 |
| WO | WO-9712019 | A1 * | 4/1997 | C11D 1/65 |
| WO | WO-2020018891 | A1 * | 1/2020 | C11D 1/29 |

* cited by examiner

CONCENTRATED GLASS CLEANING COMPOSITIONS IN UNIT DOSE PACKETS OR POUCHES

CROSS-REFERENCE TO RELATED APPLICATIONS

This application claims the benefit of priority under 35 U.S.C. § 120 of U.S. Provisional Application No. 62/964,790, entitled "Concentrated Glass Cleaning Compositions in Unit Dose Packets or Pouches," filed Jan. 23, 2020, the entire contents of which are incorporated by reference in this disclosure.

TECHNICAL FIELD

The present disclosure is directed to glass cleaning compositions, in particular concentrated glass cleaning compositions that are in the form a unit dose product.

BACKGROUND

There are currently numerous window and glass spray cleaner products on the market. These are conventionally sold in plastic spray bottles as dilute solutions of alcohol, solvents, and surfactants in water, and the majority of the weight of the product is water and the plastic container (e.g. usually PET plastic). These products do not have a good environmental footprint, as there is a lot of water and plastic being consumed and transported for a very small amount of cleaning chemicals.

SUMMARY

The present disclosure is directed to glass cleaning compositions provided in the form of concentrated glass cleaning compositions contained in a unit dose packets or pouches. Concentration of glass cleaner formulations into packets of water soluble polyvinyl alcohol film can used as unit dose product, which can be conveniently dropped into an empty bottle and filled with water to make the dilute version of the product. The unit dose (i.e. packet of liquid concentrate) packet of concentrated glass cleaning composition can be inserted into a standard bottle and diluted with water to create a glass cleaner solution. The glass cleaner solution can then be used to clean glass surfaces, such as windows, car windows, shower doors, mirrors, glass tables, optical glass, glass containers, or other glass surfaces or articles. The glass cleaner solution produced from the unit dose packet of concentrated glass cleaning composition can be used to clean other surfaces as well. The concentrated glass cleaning composition of the unit dose packet would have a chemical concentration level of between 25 to 100 times the current products on the market, thus providing a savings in water, plastic, transport and also a reduction in landfill demand or plastic recycling resources. The concentrated glass cleaning compositions can be packaged in unit dose formats such that the unit dose item (i.e. a small packet of liquid encased in polyvinyl alcohol film) could be of a size (between 5 to 50 grams) and geometry to be conveniently inserted into a small bottle neck (e.g. neck having an inner diameter of from 20 mm to 25 mm) for use in commercially available window trigger spray bottles. Alternatively, the unit dose packet could be up to 50 grams in mass so as to be used for larger spray or dispensing containers for institutional or industrial use. The unit dose packet of the concentrated window cleaning composition can be constructed with a water soluble casing (e.g. polyvinyl alcohol film) that can be rapidly disintegrated into a ready to use dilute solution without any visible particulates, by simply the addition of water and agitation (e.g., shaking the bottle).

In one or more aspects disclosed herein, a unit dose glass cleaner concentrate product may include from 5 grams to 50 grams of a concentrated glass cleaning composition encased in a water soluble film. The concentrated glass cleaning composition may include at least one cleaning solvent and at least one surfactant. The total weight percentage of the cleaning solvents and surfactants, expressed on an anhydrous basis, may be at least 50% of the weight of the unit dose window cleaner concentrate product.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

The unit dose glass cleaning packet may include a concentrated window cleaning composition that may include at least one or more cleaning solvents and one or more surfactants. The concentrated window cleaning compositions of the present disclosure may also include one or more colorant(s), one or more preservatives (i.e. to preserve the diluted format of the product), some water content in the concentrated version for the purpose of polyvinyl alcohol film stability and packet/pouch integrity on storage, a pH control agent or alkaline source, or combinations of these. Chelants, dispersive polymers, or both can be included in the concentrated window cleaning compositions for hardness control. The concentrated window cleaning compositions can also include one or more polymeric or other surfactant like surface modification agents for making the window surface more hydrophilic, and to repel soils. In embodiments, the concentrated window cleaning compositions can include one or more lower alcohols, which can provide for fast drying. The concentrated window cleaning compositions can also include one or more enzymes for cleaning efficacy. One or more thickening agent can be used to improve the handling of the liquid into the vacuum cavity machine that makes the packets; to improve the rheological behavior (i.e. low drainage rate after spraying onto vertical surfaces) of the diluted liquid in use; and to suspend solid particles of functional ingredients within the overall concentrated glass cleaning compositions.

Formulating a concentrated glass cleaning composition for including in a unit dose packet presents several technical challenges. The concentrated versions of the chemicals, which are aimed at replicating commercial products in dilute format, may have a sufficiently low flash point so as to make the product flammable or combustible. Careful design of the formulation can ensure a compromise is reached between achieving a formula with highly effective solvent action and a formula that can be safely processed, handled, stored, and used by the consumer. For example, the use of lower aliphatic alcohols for fast drying applications must be limited or eliminated due to the incompatibility with the encasing film, and issues with creating a flammable concentrate. As used in the present disclosure, the terms "lower alcohols" and lower aliphatic alcohols" refer to alcohols having less than or equal to 4 carbon atoms, such as but not limited to methanol, ethanol, 1-propanol, isopropanol, 1-butanol, or combinations of these. Similarly, common alkaline bases used in dilute formulations, when concentrated by a factor of 25-100 times for the concentrated packet, can create incompatibilities with the polyvinyl alcohol film due to, for example, chemical hydrolysis of the polyvinyl alcohol (i.e. strong metal alkali such as ammonium or sodium hydroxide can hydrolyze the film) or solvent penetration through the polyvinyl alcohol film (e.g. high levels of ethanolamine).

Another challenge involves shelf life. Following dilution of the concentrated glass cleaning composition, the diluted solution may be susceptible to microbial spoilage due to the fact that polyvinyl alcohol film and other formulation constituents are a nutrient source. This microbial spoilage can be reduced or prevented by raising the pH of the concentrated glass cleaning composition. However, the pH level of the concentrated glass cleaning composition needed to make a dilute glass cleaning solution of sufficiently high pH for prevention of microbial growth would make the concentrated glass cleaning composition incompatible with the encasing polyvinyl alcohol film, due to hydrolysis, and corrosive to handle in the event of a rupture. This problem can be solved in the present disclosure by incorporating a preservative into the concentrated glass cleaning composition at a sufficiently high enough concentration so that even after being diluted, the preservative concentration can inhibit microbial growth. Selection of the preservative should account for compliance with local and national regulations pertaining to the allowed concentrations of the specific preservatives in the concentrated glass cleaning composition prior to dilution (undiluted product).

Another challenge is that a typical use would involve dilution with municipal water, of varying hardness, which can impair the performance of surfactants typically used in commercial glass cleaning formulations. This problem can be overcome by incorporating a surfactant or blends of surfactants whose performance are relatively insensitive to water hardness, while providing excellent wetting of the surfaces to be cleaned, appropriate foaming, and minimal streak or residue after application to the surface.

Cleaning Solvents

The concentrated glass cleaning compositions of the present disclosure may include one or a plurality of cleaning solvents. The cleaning solvents, either low or high VOC or VOC free, are included to provide cleaning action. The cleaning solvents used in the concentrated glass cleaning composition of the present disclosure may include glycol ethers, lower boiling point alcohols, or some combination of these, in which the individual components may fall into one of a number of VOC classifications depending upon its molecular weight, structure and vapor pressure. In the glycol ether category, these glycol ethers that may be used as the cleaning solvent may include but are not limited to dipropylene glycol n-propyl ether, dipropylene glycol n-butyl ether, propylene glycol n-butyl ether, propylene glycol n-propyl ether, tripropylene glycol n-butyl ether, propylene glycol phenyl ether, dipropylene glycol phenyl ether, propylene glycol methyl ether, propylene glycol methyl ether acetate, dipropylene glycol methyl ether, dipropylene glycol methyl ether acetate, tripropylene glycol methyl ether, ethylene glycol hexyl ether, diethylene glycol hexyl ether, ethylene glycol propyl ether, diethylene glycol phenyl ether, ethylene glycol phenyl ether, poly (oxy-1,2-ethanediyl), alpha-phenyl-omega-hydroxy, diethylene glycol ethyl ether, diethylene glycol n-butyl ether, ethylene glycol n-butyl ether. The glycol ether solvents listed above may be obtained from suppliers such as Dow Chemical or Eastman Chemical.

Cleaning solvents may also include alcohols, such as but not limited to methanol, ethanol, isopropanol, 1-propanol, or higher weight alcohols suitable for hard surface applications. However, the use of these highly-volatile, lower molecular weight solvents may be problematic due to safety issues and film compatibility.

Safer Cleaning Solvents

In embodiments, the concentrated glass cleaning compositions may include other safer cleaning solvents that may have better safety and environmental profiles compared to the glycol ethers and lower alcohols, and may be used to create more bio-based products. Some examples of other safer cleaning solvents may include, but are not limited to 1,3 propanediol, ethyl levulinate glycerol ketal, ethyl levulinate propylene glycol ketal, soybean oil methyl esters, canola oil methyl esters, glycerine, butyl 3-hydroxybutyrate, ethyl lactate, gamma-valerolactone, 2-methytetrahydrofuran, cyclopentylmethylether, or combinations of these. Any one or a combination of these other safer cleaning solvents and the aforementioned glycol ether and alcohol cleaning solvents may be included in the concentrated glass cleaning composition. In embodiments, the cleaning solvents in the concentrated glass cleaning composition may include at least one safer solvent selected from the group consisting of 1,3 propanediol, ethyl levulinate glycerol ketal, ethyl levulinate propylene glycol ketal, soybean oil methyl esters, canola oil methyl esters, glycerine, butyl 3-hydroxybutyrate, ethyl lactate, gamma-valerolactone, 2-methytetrahydrofuran, cyclopentylmethylether, and combinations of these.

The concentrated glass cleaning compositions may include greater than or equal to 20 wt. %, greater than or equal to 30 wt. %, or even greater than or equal to 40 wt. % cleaning solvents based on the total weight of the concentrated glass cleaning composition. The concentrated glass cleaning compositions may include less than or equal to 100 wt. %, less than or equal to 80 wt. %, less than or equal to 75 wt. %, or even less than or equal to 70 wt. % cleaning solvents based on the total weight of the concentrated glass cleaning composition. The concentrated glass cleaning compositions may include from 20 wt. % to 100 wt. % cleaning solvents based on the total weight of the concentrated glass cleaning composition. In embodiments, the concentrated glass cleaning composition may include from 20 wt. % to 80 wt. %, from 20 wt. % to 75 wt. % or from 20 wt. % to 70 wt. % cleaning solvents based on the total weight of the concentrated glass cleaning composition.

Surfactants

The concentrated glass cleaning compositions of the present disclosure may include one or a plurality of surfactants. Surfactants may be included to wet the surface, and provide soil emulsification. Surface tension reduction provided by the surfactants, may allow for avoidance of the formation of large droplets (>25 um), which can diffract visible light when dry, leaving streaks. Surfactant selection and ratios may be determined by balancing the factors of cold water solubility, critical micelle concentration (CMC), hardness ion tolerance, foam generation, and soil removal performance. The surfactants used could be selected from any commercially available anionic and nonionic surfactants suitable to be used in hard surface cleaning. For example, surfactants that can be used in the concentrated glass cleaning compositions of the present disclosure can include, but are not limited to, one or a combination of anionic and nonionic surfactants, such as sodium alkylbenzene sulfonate (e.g. sodium dodecylbenzene sulfonate or NaDBSA) or other cationic salts of alkylbenzene sulfonate, sodium alkyl methyl ester sulfonate (MES), sodium alkyl sulfate, sodium alkyl ether sulfate, alpha olefin sulfonates (AOS), and alcohol ethoxylates, castor oil ethoxylates or other ethoxylated triglycerides, block co-polymers of ethylene oxide and propylene oxide, and alcohol methyl ester ethoxylates (MEE), and ethyoxlated triglycerides (eg. ethoxylated castor oil).

Anionic surfactants are the principal surfactants for particulate soil removal. Cold water solubility favors the use of NaDBSA as an anionic surfactant, despite its water hardness intolerance. The monoethanolamine salt of DBSA can be used to optimize solubility. Alkyl sulfates, despite water hardness intolerance, and can be incorporated. Branched chain alkyl sulfates have better cold water solubility than straight chain, and smaller hydrophobic chain surfactants dissolve faster, however a balance between solubility, speed, CMC, oil/water interfacial tension and soil removal performance can be considered. Alkyl ethoxylated or alkoxylated sulfates may also be included due to better water hardness tolerance relative to NaDBSA and alkyl sulfates. Alcohol alkoxylated sulfates that have branched hydrophobes may offer improved solubility, and alcohol alkoxylated sulfates with relatively long hydrophobic (with branching) and hydrophilic groups may be included to provide for cold water detergency, offering low interfacial tension and fast solubilization. MES has good water hardness tolerance and low CMC relative to NaDBSA. The concentrated glass cleaning composition may include an anionic surfactant with good water hardness tolerance, such as but not limited to sodium alkyl ether sulfate, which may provide for superior performance when the concentrated glass cleaning composition is diluted with municipal water having varying degrees of water hardness. Surfactants incorporated into the concentrated glass cleaning composition may be used in their concentrate forms to reduce the amount of water introduced into the formulation from the surfactant to maintain the overall water content of the concentrated glass cleaning composition within a tight range of from 5 wt. % to 15 wt. % water or about 10 wt. % water based on the total weight of the concentrated glass cleaning composition.

Nonionic surfactants, primarily alcohol ethoxylates and alkoxylates, both linear and branched (improved water solubility) may also be included in the concentrated glass cleaning compositions, specifically for very hydrophobic oily soil removal. These nonionic surfactants generally may have a lower CMC and lower oil/water interfacial tension than most anionic surfactants. Melting point, dissolution rate, water solubility, oil/water interfacial tension and CMC may be considered in selection of nonionic surfactants. The degree of branching, the position and length of branches, the relative size of the hydrophobic and hydrophilic groups and the composition of the hydrophilic groups are all chemical variables impacting physical, chemical, and performance properties of the nonionic surfactants. Guerbet alcohol ethoxylates (branched) are particularly useful in cold water, due to improved solubility. Narrow range ethoxylates can be used for improved water solubility and performance as well. Smaller molecules, with the appropriate balance of hydrophobe to hydrophile size, such as C8-10 hydrophobes with 6 moles of EO (ethoxylate units) for example, offer faster dissolution and better cold water solubility, and less surface residue after application compared to the more hydrophobic alcohol ethoxylates with fewer EO moieties and larger hydrophobic chains.

Fatty acid methyl ester ethoxylates and ethoxylates of vegetable oils that include of complex mixtures of both hydrophilic and hydrophobic substances can be useful in some embodiments. The later, when castor oil is used and ethoxylated, may contain glycerol polyethylene glycol ricinoleate, fatty acid esters of polyethylene glycol and some unchanged vegetable oil, as well as polyethylene glycols and glycerol ethoxylates.

In embodiments, other classes of surfactants, such as alkyl polyglucosides (APG) can be included in the concentrated glass cleaning compositions. These surfactants have a better safety and sustainability/environmental profile. In combination with newer solvent-surfactant hybrids, concentrated glass cleaning compositions with a very high bio-based carbon content can be prepared. During selection for this application, particular attention must be made to the carbon chain length distribution and degree of polymerization of the APG to create the most optimal approach for streak free appearance. In embodiments, the concentrated glass cleaning compositions may include Glucopon® 425N alkyl polyglycoside surfactant as one of the surfactants. Glucopon® 425N alkyl polyglycoside surfactant is manufactured by BASF Corporation.

In embodiments, amphoteric and/or ampholytic surfactants can be used in the concentrated glass cleaning composition. Such examples include but are not limited to surfactant classes such as betaines, hydroxyl sultaine, amphoacetates, amphopropionates, aminopropionates (e.g. ampholytic), amine oxides (e.g. ampholytic). Amine oxides, in particular lauramine oxide, coupled with a sodium alkyl ether sulfate, may be included in the concentrated glass cleaning compositions for good overall surfactant performance in this application. In embodiments, the surfactants in the concentrated glass cleaning compositions may include amine oxides, such as lauramine oxide, and sodium alkyl ether sulfate.

The concentrated glass cleaning compositions may include greater than or equal to 0 wt. %, greater than or equal to 0.1 wt. %, greater than or equal to 1 wt. %, or even greater than or equal to 10 wt. % surfactants based on the total weight of the concentrated glass cleaning composition. The concentrated glass cleaning compositions may include less than or equal to 100 wt. %, less than or equal to 80 wt. %, less than or equal to 75 wt. %, or even less than or equal to 70 wt. % surfactants based on the total weight of the concentrated glass cleaning composition. The concentrated glass cleaning compositions may include from 0 wt. % to 80 wt. %, from 0.1 wt. % to 75 wt. %, from 0.1 wt. % to 70 wt. %, or from 1 wt. % to 70 wt. % surfactants based on the total weight of the concentrated glass cleaning composition. As discussed above surfactants are often available as surfactant compositions, even as concentrates, comprising the surfactant and other constituents such as small amounts of water or other solvent. The weight percentages in this paragraph are based on the total weight of surfactant compositions that include the surfactants.

The unit dose window cleaner concentrate product can comprise a total weight percentage of the cleaning solvents and surfactants of at least 50 wt. %, at least 60 wt. %, or even at least 70 wt. % cleaning solvents and surfactants based on the total weight of the unit dose window cleaner concentrate product, where the weight percentages are expressed on an anhydrous basis (e.g., without accounting for the weight of water in the surfactants or cleaning solvents). In embodiments, the unit dose window cleaner concentrate product comprises from 50 wt. % to 100 wt. %, from 50 wt. % to 90 wt. %, from 50 wt. % to 80 wt. %, from 60 wt. % to 100 wt. %, from 60 wt. % to 90 wt. %, from 60 wt. % to 80 wt. %, from 70 wt. % to 100 wt. %, from 70 wt. % to 90 wt. %, or from 70 wt. % to 80 wt. % cleaning solvents and surfactants, on an anhydrous basis, based on the total weight of the unit dose window cleaner concentrate product.

Water

The concentrated glass cleaning compositions can include some water, whether introduced through one or more constituents (e.g., surfactant compositions or other constituents that include at least some water content) or added purposefully. In embodiments, the concentrated glass cleaning compositions may include less than or equal to 20 wt. %, less than or equal to 15 wt. %, less than or equal to 10 wt. % or even less than or equal to 5 wt. % water based on the total weight of the concentrated glass cleaning compositions.

Solvents and Coupling Agents with Surfactant Augmenting Properties

In embodiments, the concentrated glass cleaning compositions can include dual functional solvents can have solvent functionality and coupling agent ability, can augment surfactant performance, and in some case be regarded as hybrids of solvent and surfactant (i.e., dual functionally). These dual functional solvents are largely water insoluble or sparingly soluble and can work synergistically with other surfactants to form mixed surfactant micelles with improved overall wetting performance. These dual-functional solvents may also be able to assist in the dissolution of fragrance materials and other very hydrophobic materials. One example of a dual functional solvent is the class of chemicals N-alkyl-2-pyrrolidone, where alkyl can be, as examples, octyl or dodecyl (e.g., Surfadone LP 100 and 300 marketed by ISP). This chemistry of N-alkyl-2-pyrrolidone and its utility in cleaning compositions is discussed in detail in U.S. Pat. No. 5,093,031, which is incorporated by reference herein in its entirety. These dual functional substances/solvents can be formulated with other solvents (e.g., glycol ethers, lower alcohols) and anionic and nonionic surfactant combinations. In embodiments, the concentrated glass cleaning compositions may include N-alkyl-2-pyrrolidones.

The concentrated glass cleaning compositions may include greater than or equal to 0 wt. %, greater than or equal to 0.1 wt. %, or even greater than or equal to 1 wt. % dual functional solvents based on the total weight of the concentrated glass cleaning composition. The concentrated glass cleaning compositions may include less than or equal to 20 wt. %, less than or equal to 15 wt. %, or even less than or equal to 10 wt. % dual functional solvents based on the total weight of the concentrated glass cleaning composition. The concentrated glass cleaning compositions may include from 0 wt. % to 20 wt. %, from 0.1 wt. % to 20 wt. %, from 1 wt. % to 20 wt. %, or from 1 wt. % to 15 wt. % dual functional solvents based on the total weight of the concentrated glass cleaning composition. In some embodiments, the concentrated glass cleaning compositions may not include the dual functional solvents.

Alkalinity and pH Control Agents

The concentrated glass cleaning compositions of the present disclosure may additionally include an alkaline compound or other pH control agent. Alkaline compounds may provide cleaning and pH control in the alkaline region for effective cleaning. In embodiments, the concentrated glass cleaning compositions may include one or more alkaline compounds, one or more pH control agents, or combinations of these.

In embodiments, ammonia may be used as the pH control agent in the concentrated glass cleaning composition. In other embodiments, any number of pH control agents can be used. For example, the use of either inorganic (e.g., hydroxides, carbonates, etc.), or organic (e.g., amines, monoalkylamines, dialkylamines, and trialkylamines with 1 to 4 carbon atoms in the alkyl radical, the corresponding mono-, di-, or trialkanolamines with 2 to 4 carbons atoms in each alkylol, cycloalkylamines, and heterocyclic amines) compounds for pH control may be included in the concentrated glass cleaning compositions. In embodiments, the concentrated glass cleaning compositions may include a pH control agent that is monoethanolamine.

In some embodiments, the raw materials used and the low water content may provide for a very alkaline pH of the concentrated glass cleaning composition, and the use of an acidic pH adjusting agent (e.g. citric acid or alternative pH adjusting agent) may be included in the concentrated glass cleaning composition.

The concentrated glass cleaning compositions may include greater than or equal to 0 wt. %, greater than or equal to 0.1 wt. %, or even greater than or equal to 1 wt. % pH control agents, alkaline compounds, or both, based on the total weight of the concentrated glass cleaning composition. The concentrated glass cleaning compositions may include less than or equal to 30 wt. %, less than or equal to 25 wt. %, less than or equal to 20 wt. %, or even less than or equal to 15 wt. % pH control agents, alkaline compounds, or both, based on the total weight of the concentrated glass cleaning composition. The concentrated glass cleaning compositions may include from 0.1 wt. % to 30 wt. %, from 1 wt. % to 30 wt. %, from 1 wt. % to 25 wt. %, or from 2 wt. % to 20 wt. % pH control agents, alkaline compounds, or both, based on the total weight of the concentrated glass cleaning composition.

Preservation

The concentrated glass cleaning compositions of the present disclosure may include one or a plurality of preservatives, which may be operable to prevent microbial growth in the diluted glass cleaning solution after dilution. In some embodiments, preservatives may be included if the diluted product is able to support microbial growth. This is will depend upon, among other things, the pH once diluted and the overall composition of surfactants and solvents. It is understood that the polyvinyl alcohol film, once dissolved in the diluted product, may be a nutrient source that can facilitate microbial growth. The preservative can be selected such that is it effective across bacteria, yeast and molds. Any one of many preservatives, approved for use in household cleaning products may be considered. In particular, preservatives suitable for inclusion in the concentrated glass cleaning compositions of the present disclosure may include, but are not limited to, methylchloroisothiazolinone, methylisothiazolinone, benzisothiazolinone, benzalkonium chloride, benzethonium chloride, benzoic acid or sodium benzoate, benzyl alcohol, choroxylenol, salicylic acid or its metal salt form, sorbic acid or its metal salt form, or some combination of these. It is understood that preservatives other than those listed may also be suitable for use in the concentrated glass cleaning compositions of the present disclosure.

The concentrated glass cleaning compositions may include greater than or equal to 0 wt. %, greater than or equal to 0.1 wt. %, or even greater than or equal to 1 wt. % preservatives based on the total weight of the concentrated glass cleaning composition. The concentrated glass cleaning compositions may include less than or equal to 20 wt. %, less than or equal to 15 wt. %, or even less than or equal to 10 wt. % preservatives based on the total weight of the concentrated glass cleaning composition. The concentrated glass cleaning compositions may include from 0 wt. % to 20 wt. %, from 0.1 wt. % to 20 wt. %, from 1 wt. % to 20 wt. %, or from 1 wt. % to 15 wt. % preservatives based on the total weight of the concentrated glass cleaning composition. In some embodiments, the concentrated glass cleaning compositions may not include preservatives.

Chelants and Dispersive Polymers

The concentrated glass cleaning compositions of the present disclosure may include one or more chelants, dispersive polymers, or both. These chelants and/or dispersive polymers may be used as water hardness control agents given that the dilution of the concentrated glass cleaning compositions may involve the use of municipal water of varying hardness, and that, in specialty applications, the glass surfaces may include hardness stains (e.g., hardness stains on glass shower stalls). Of course, one disadvantage of such materials is that chelants could chemically chelate and leach out metal ions from glass, damaging the surface. Thus, in embodiments, the concentrated glass cleaning compositions may not include chelants. However, in embodiments, when only hard water is available for dilution of the concentrate, and/or when the surfaces of glass may have hardness stains, some level of a chelant, or chelating polymer or dispersive polymer in the concentrated glass cleaning composition may be used. Strong chelants have high stability constant logarithms for both calcium and heavier metal ions (e.g., pK(Ca) greater than 5, where pK(Ca) is the stability constant logarithm for calcium) at the relevant wash pH conditions. The stability constant logarithm, pK(M) is a measure of the strength of the complex between the metal ion (M) and the chelant at the relevant wash pH conditions. Chelation with the strong metal ion chelant provides water soluble chelation. In some embodiments, the strong chelant may include N,N-bis(carboxymethyl) glutamic acid (GLDA). Other strong chelants that may be incorporated include, but are not limited to, methylglycine diacetic acid (MGDA), ethylene diamine tetraacetic acid (EDTA), iminodisuccinic acid (IDS), other strong chelants, or combinations of these. In embodiments, the concentrated glass cleaning composition may include one or more strong chelants selected from the group consisting of N,N-bis (carboxymethyl) glutamic acid (GLDA), methylglycine diacetic acid (MGDA), ethylene diamine tetraacetic acid (EDTA), iminodisuccinic acid (IDS), other strong chelants, and combinations of these. In some embodiments, the concentrated glass cleaning composition does not include a strong chelant.

In embodiments, the concentrated glass cleaning compositions may include one or more weak chelants, with or without the presence of a strong chelant. Weak chelants may include, but are not limited to, sodium citrate, sodium citrate dihydrate, or combinations thereof. In some embodiments, the weak chelant may be a citrate formed in situ during manufacturing of the composition through the reaction of citric acid and an alkaline material in the concentrated glass cleaning composition or some component of the concentrated glass cleaning composition. In some embodiments, other weak chelants, such as ethylenediamine-N,N-disuccinic acid (EDDS) for example, may be incorporated into the concentrated glass cleaning composition. In some embodiments, the concentrated glass cleaning composition does not include weak chelants. In some embodiments, the concentrated glass cleaning composition may include one or more weak chelants but does not include strong chelants. In some embodiments, the concentrated glass cleaning composition may include one or more strong chelants, but does not include weak chelants. In some embodiments, the concentrated glass cleaning compositions may include both strong chelants and weak chelants.

The concentrated glass cleaning compositions may include greater than or equal to 0 wt. %, greater than or equal to 0.1 wt. %, or even greater than or equal to 1 wt. % chelants based on the total weight of the concentrated glass cleaning composition. The concentrated glass cleaning compositions may include less than or equal to 20 wt. %, less than or equal to 15 wt. %, or even less than or equal to 10 wt. % chelants based on the total weight of the concentrated glass cleaning composition. The concentrated glass cleaning compositions may include from 0 wt. % to 20 wt. %, from 0.1 wt. % to 20 wt. %, from 1 wt. % to 20 wt. %, or from 1 wt. % to 15 wt. % chelants based on the total weight of the concentrated glass cleaning composition.

In some embodiments, the concentrated glass cleaning composition may include one or more dispersive polymers. The dispersive polymers may be used as water hardness control agents given that the dilution of the concentrated glass cleaning compositions may involve the use of municipal water of varying hardness. Dispersive polymers may include, but are not limited to, acrylate polymers, acrylic/maleic copolymers, terpolymers, copolymers of carboxylic acid containing monomer units and sulfonic acid containing monomer units, polymers using itaconic acid monomers, sulfonic acid/sulfonated styrene monomers, or combinations of these polymers.

The concentrated glass cleaning compositions may include greater than or equal to 0 wt. %, greater than or equal to 0.1 wt. %, or even greater than or equal to 1 wt. % dispersive polymers based on the total weight of the concentrated glass cleaning composition. The concentrated glass cleaning compositions may include less than or equal to 20 wt. %, less than or equal to 15 wt. %, or even less than or equal to 10 wt. % dispersive polymers based on the total weight of the concentrated glass cleaning composition. The concentrated glass cleaning compositions may include from 0 wt. % to 20 wt. %, from 0.1 wt. % to 20 wt. %, from 1 wt. % to 20 wt. %, or from 1 wt. % to 15 wt. % dispersive polymers based on the total weight of the concentrated glass cleaning composition. In some embodiments the concentrated glass cleaning compositions do not include a dispersive polymer.

Surface Modification Additives (e.g. Antifogging) and Improved Wetting

In embodiments, one or more surface modification polymers that have an antifogging or improved wetting effect may be included in the concentrated glass cleaning compositions of the present disclosure. These surface modification polymers can increase the hydrophilicity of the surface for improved wetting, anti-fog and rapid drying. These surface modification polymers can include, but are not limited to, copolymers of ethylenically-unsaturated dicarboxylic acid anhydride or partial ester thereof with an ethylenically-unsaturated monomer that has no carboxyl groups (U.S. Pat. No. 3,939,090), styrene/maleic anhydride copolymer (U.S. Pat. No. 3,696,043), high mole weight water soluble nonionic polyoxyethylene glycol (U.S. Pat. No. 4,242,725), and polyvinyl alcohol of various molecular weights (U.S. Pat. No. 4,539,145). U.S. Pat. Nos. 3,939,090, 3,696,043, 4,242,725, and 4,539,145 are incorporated by reference herein in their entirety. In embodiments, the concentrated glass cleaning compositions can include copolymers of methyl vinyl ether and maleic anhydride (e.g., GANTREZ™ s-97 copolymers produced by Ashland). Another anti-fog polymers include cationic hydrophilic polymers, such as NOVERITE™ 311 functional polymers produced by the Lubrizol Corporation, which could be incorporated into some embodiments of the concentrated glass cleaning composition.

The concentrated glass cleaning compositions may include greater than or equal to 0 wt. %, greater than or equal to 0.1 wt. %, or even greater than or equal to 1 wt. % surface modification polymers based on the total weight of the concentrated glass cleaning composition. The concentrated glass cleaning compositions may include less than or equal to 20 wt. %, less than or equal to 15 wt. %, or even less than or equal to 10 wt. % surface modification polymers based on the total weight of the concentrated glass cleaning composition. The concentrated glass cleaning compositions may include from 0 wt. % to 20 wt. %, from 0.1 wt. % to 20 wt. %, from 1 wt. % to 20 wt. %, or from 1 wt. % to 15 wt. % surface modification polymers based on the total weight of the concentrated glass cleaning composition. In some embodiments, the concentrated glass cleaning composition does not include surface modification polymers.

Suspended Chemicals in the Liquid Concentrate

In embodiments, the concentrated glass cleaning composition may include a plurality of suspended solid particles comprising one or more active ingredients or solvents of the concentrated glass cleaning composition disclosed herein. Given that the concentrated liquid of the concentrated glass cleaning composition is almost devoid of water, (i.e., only 1-15% free water), in embodiments, the concentrated glass cleaning composition of the present disclosure may include using, within the concentrated liquid, suspended solid particles of water-soluble polyvinyl alcohol or other polymers or surfactants or other surface modification agents, that would be fully dissolved upon dilution of the concentrated glass cleaning composition. The suspended solid particles may include one or more of surfactants, chelants, chelating polymers, dispersive polymers, or combinations of these.

Additionally, the concentrated glass cleaning compositions of the present disclosure may further comprise one or more suspending agents, structuring agents, thickening agents, or combinations of these, wherein the suspending agents, structuring agents, thickening agents, or combinations of these improve suspension of the solid particles in the solvents. In embodiments, the concentrated glass cleaning compositions may include structuring agents (e.g., cross linked polyacrylates, or naturally derived structuring agent chemicals) that provide thixotropy, psuedoplasticity or other viscosity building effects in the concentrated glass cleaning compositions to aid in suspension of such suspended solid particles. In embodiments, the concentrated glass cleaning composition does not include suspended solid particles.

Hydrotropes and Solubilizers

In embodiments, the concentrated glass cleaning compositions may include hydrotropes or coupling agents/solubilizers to assist making the surfactants and solvents more soluble in the sparingly aqueous concentrate. The hydrotropes may be synthetic or naturally derived. Some examples or hydrotropes include, but are not limited to, sodium xylene sulfonate, sodium cumene sulfonate, sodium n-octyl sulfate, sodium octane sulfonate, or combinations of these. Some examples of coupling agents/solubilizers that can be incorporated into the concentrated glass cleaning compositions for making the concentrated glass cleaning compositions compatible with the PVA film or for making the ingredients soluble with each other may include, but are not limited to, propylene glycol, dipropylene glycol, glycerine, other solubilizers used in household cleaning formulations, or combinations of these.

The concentrated glass cleaning compositions may include greater than or equal to 0 wt. %, greater than or equal to 0.1 wt. %, or even greater than or equal to 1 wt. % hydrotropes, coupling agents/solubilizers, or both, based on the total weight of the concentrated glass cleaning composition. The concentrated glass cleaning compositions may include less than or equal to 30 wt. %, less than or equal to 25 wt. %, or even less than or equal to 20 wt. % hydrotropes, coupling agents/solubilizers, or both, based on the total weight of the concentrated glass cleaning composition. The concentrated glass cleaning compositions may include from 0 wt. % to 30 wt. %, from 0.1 wt. % to 30 wt. %, from 1 wt. % to 30 wt. %, or from 1 wt. % to 25 wt. % hydrotropes, coupling agents/solubilizers, or both, based on the total weight of the concentrated glass cleaning composition. In some embodiments, the concentrated glass cleaning compositions do not include hydrotropes. In some embodiments, the concentrated glass cleaning compositions do not include coupling agents/solubilizers.

Other Additives

Colorant(s), fragrances, or both may be included in the concentrated glass cleaning compositions for aesthetics purposes. One or a plurality of enzymes may be included in the concentrated glass cleaning compositions for unique glass cleaning applications. Examples of enzymes may include hydrolases, such as but not limited to proteases, amylases, lipases, or other hydrolases. In embodiments, the concentrated glass cleaning composition may not include enzymes. In some embodiments, the concentrated glass cleaning composition does not include colorants or fragrances.

As previously discussed, in embodiments, the concentrated glass cleaning compositions may include a thickening agent to improve the rheological behavior (i.e. low drainage rate after spraying onto vertical surfaces) of the dilute glass cleaning solution made using the concentrated glass cleaning compositions. The thickening agents may also be used to suspend solid particles of functional ingredients within the liquids of the concentrated glass cleaning composition. Thickening agents include any or all synthetic or natural agents that provide increased viscosity and/or pseudoplasticity and/or thixotropy to the liquid, and can include polymers such as cross-linked polyarcylates (e.g., Carbopol brand thickeners from Lubrizol), and/or natural thickeners such as xanthan gum, and others. In some embodiments, the concentrated glass cleaning compositions do not include thickening agents.

Encasing Film Selection

The unit dose glass cleaner concentrate product may include the concentrated glass cleaning composition contained within a packet or pouch formed by a polyvinyl alcohol (PVA) film. The PVA film may have suitable mechanical and chemical properties, as defined by the degree of hydrolysis of the polyvinyl acetate to alcohol and the degree of polymerization, the solvents, plasticizers used and other processing and formulation aspects. The PVA film can be able to form a packet or pouch of sufficient mechanical strength to meet consumer regulations and can provide for a product that has suitable stability on storage under a variety of temperature and humidity conditions as experienced in commerce and consumer households. PVA films produced by Aicello or Kurray (Monosol division) may be used, but there are many other commercial suppliers.

In some embodiments, films may be formulated with combinations of one or more of polyvinyl alcohol and polyvinyl pyrrolidone, ethoxylated alkyphenol, polyacrylic acid and polyhydric alcohol (U.S. Pat. Nos. 4,481,326, 4,544,693, 4,692,494, 4,765,916, which are incorporated by reference herein in their entirety); water soluble laminate films that comprise at least one methylcellulose layer of hydroxybutyl methylcellulose blended with hydroxypropyl methylcellulose and polyvinyl alcohol as a cross linking agent (U.S. Pat. No. 4,801,636, which is incorporated by reference herein in its entirety); blends of polyvinyl alcohol and alkyl cellulose with a metalloid oxide to inhibit dissolution of the film encasing a strongly alkaline liquid but allow dissolution in a less alkaline solution (U.S. Pat. No. 4,972,017, which is incorporated by reference herein in its entirety); or films with polyvinyl alcohol and a water insoluble cellulose material (U.S. Pat. No. 5,272,191, which is incorporated by reference herein in its entirety).

In some embodiments, the utility of polyvinyl alcohol in improving wetting of the glass surface by surface modification suggests that the encasing film may be further optimized in terms of using specific molecular weights or blends of molecular weights of polyvinyl alcohol within the composition of the encasing film, so that on dissolution to the dilute product, an optimum wetting performance can be achieved.

The unit dose glass cleaner concentrate product may be prepared by preparing the concentrated glass cleaning composition and sealing a portion of the concentrated glass cleaning composition within a pouch or packet formed by a water soluble film, such as PVA. Preparing the concentrated glass cleaning composition may include combining one or more of the constituents of the concentrated glass cleaning composition and mixing the combined constituents to produce a homogeneous concentrated glass cleaning composition. The constituents of the concentrated glass cleaning composition may be any of the constituents previously described in this disclosure, such as but not limited to one or more cleaning solvents, one or more surfactants, one or more dual functional substances/solvents, one or more alkaline compounds, one or more pH control agents, one or more preservatives, one or more chelants, one or more dispersive polymers, one or more surface modification additives, one or more hydrotropes, one or more coupling agents/solubilizers, one or more thickening agents, or combinations of these. The pouches or packets containing the concentrated glass cleaning composition may be produced and sealed by any known machine and/or technique.

Each packet or pouch of the unit dose glass cleaner concentrate product may include from 5 grams to 50 grams of the concentrated glass cleaning composition. In embodiments, each packet or pouch may have a size of from 5 grams to 20 grams and a geometry to enable the packet or pouch to be conveniently inserted into a small bottle neck (e.g. neck having an inner diameter of from 20 mm to 25 mm) for use in commercially available window trigger spray bottles. The shape of the packets or pouches may be long and cylindrical in shape, with rounded ends, and with a length to diameter ratio from 2:1 to 20:1. Such shapes could be used for domestic spray trigger bottles with standard 28-400 neck finishes, or other similar dimensions. The packets or pouches may also be considered for larger bottles with larger openings, and may be formed into a variety of shapes, sizes and liquid compartments. In some embodiments, the unit dose packet could be from 20 grams to 50 grams in mass so as to be used for larger spray or dispensing containers for institutional or industrial use.

A method of cleaning a glass surface may include providing the unit dose glass cleaner concentrate product, which may be a unit dose packet or pouch containing the concentrated glass cleaning composition, as described in the present disclosure. The method may further include adding the unit dose packet or pouch to a vessel, such as a spray bottle, bucket, or other container, and adding water to the unit dose packet or pouch, where adding water to the unit dose packet or pouch causes a film of the unit dose packet or pouch to dissolve, releasing the concentrated glass cleaning composition into the water. The concentrated glass cleaning composition of the unit dose glass cleaner concentrate product may be diluted by from 25 times to 100 times in water. The method may include mixing or agitating the water and concentrated glass cleaning composition to produce a dilute glass cleaning solution. The method may further include contacting the dilute glass cleaning solution to the glass surface. The method may further include wiping the dilute glass cleaning solution off of the glass surface.

In embodiments, the unit dose glass cleaner concentrate product may include the concentrated glass cleaning composition enclosed within a water soluble film, and the concentrated glass cleaning composition may comprise, consist, or consist essentially of: (1) one or more cleaning solvents, (2) one or more surfactants, (3) optionally, one or more colorants, fragrances, or both, (4) optionally, one or more preservatives, (5) optionally, some water content in the concentrated version for the purpose of polyvinyl alcohol film stability and packet/pouch integrity on storage, (6) optionally, one or more pH control agent, alkaline compounds, or both, (7) optionally, one or more chelants, (8) optionally, one or more dispersive polymers, (9) optionally, one or more surface modification agents, (10) optionally, one or more enzymes, and (11) optionally, a thickening agent. The cleaning solvents, surfactants, colorants, fragrances, preservatives, pH control agents, alkaline compounds, chelants, dispersive polymers, surface modification agents, enzymes, and thickening agents may have any of the features, compositions, or weight percentages previously described for each of these compounds.

EXAMPLES

The following examples demonstrate formulations of the concentrated glass cleaning compositions that have been successfully prepared and encapsulated into stable liquid packets/pouches with good shelf life properties. The following formulations are clear solutions in appearance. However, as previously discussed, colorants or other constituents may be incorporated that may change the appearance of the solutions to produce translucent, opaque, or colored solutions in addition to clear, transparent solutions.

In all of the examples, the polyvinyl alcohol film used to manufacture the unit dose glass cleaner concentrate products was GSBTX 75 film produced by Aicello Corporation. This film contains the denaturant denatonium benzoate. The packet weight could be between 5 to 50 grams, with the intention of dilution by a factor of 25-100×in water, for either domestic (i.e. thin packets for standard trigger spray bottles) or institutional/industrial use (i.e. larger packets for larger preparation volumes and larger container neck sizes).

In all the examples below, the pH of the neat, undiluted liquid, is alkaline in the range of 10-12.5. The alkalinity and pH, in many applications, once diluted by a factor of 100, is sufficiently low so as to require a preservative, which at dilution is effective against spoilage, unless the entire diluted product is consumed immediately. For this reason, preservatives were incorporated in many of the examples and the type and level of preservative can be adjusted to meet local and federal regulations and is not limited to the examples disclosed below.

Example 1

Concentrated glass Cleaner Composition Packet/Pouch—1

| | | |
|---|---|---|
| Deionized Water (DI Water) | Water | 5.0% |
| Mixture of 1,2-Benzisothiazolin-3-one (2.5% solution) and 2-Methyl-4-isothiazolin-3-one (2.5% solution) (ACTICIDE ® MBS-Thor Specialties) | Preservative | 5.0% |
| Propylene Glycol Butyl Ether (DOWANOL ™ PnB Glycol Ether-Dow Chemical) | Cleaning Solvent | 50.0% |
| Propylene Glycol Methyl Ether (DOWANOL ™ PM-Dow Chemical) | Cleaning Solvent | 30.0% |
| Monoethanolamine from Dow Chemical | pH Control Agent | 2.5% |
| Sodium Laureth Sulfate-70% active (TEXAPON ® N70 NA-BASF) | Surfactant | 7.5% |
| Total | | 100% |

Optionally, one or more alkylpolyglucosides and/or lauramine oxide can be incorporated into the above Example 1, by reducing or eliminating some of the initial water.

Example 2

Concentrated Glass Cleaner Composition Packet/Pouch—2—Zero VOC Version

| | | |
|---|---|---|
| Mixture of 1,2-Benzisothiazolin-3-one (2.5% solution) and 2-Methyl-4-isothiazolin-3-one (2.5% solution) (ACTICIDE ® MBS-Thor Specialties) | Preservative | 5.00% |
| Dipropylene Glycol Butyl Ether (DOWANOL ™ DPnB Glycol Ether-Dow Chemical) | Cleaning Solvent | 30.00% |
| Tripropylene Glycol Methyl Ether (DOWANOL ™ TPM Glycol ether) | Cleaning Solvent | 30.00% |
| Secondary Alcohol Ethoxylate (TERGITOL ™ 15-S-7-Dow Chemical) | Surfactant | 15.00% |
| Sodium Laureth Sulfate-70% active (TEXAPON ® N70 NA-BASF) | Surfactant | 7.50% |
| Monoethanolamine from Dow Chemical | pH Control Agent | 2.50% |
| Alkyl (C8-C16) Polyglucosides 50% solution (GLUCOPON ® 425-BASF) | Surfactant | 7.00% |
| Lauryl/Myristyl Glucoside 50% solution (GLUCOPON ® 600 UP-BASF) | Surfactant | 3.00% |
| Total | | 100.00% |

In the first example, the concentrate liquid, prior to dilution, would be considered combustible. The second example uses higher molecular weight solvents and more bio-based surfactants to create a non-VOC concentrate that more amenable to processing on standard liquid mixing equipment. Both contain a preservative in sufficient concentration to provide efficacy upon dilution by a factor of 25-100 times the packet/pouch weight.

Example 3: This is Similar to Example 1 but with Fragrance and Colorant

Concentrated Glass Cleaner Composition Packet/Pouch—3

| | | |
|---|---|---|
| DI Water | Water | 3.0% |
| Mixture of 1,2-Benzisothiazolin-3-one (2.5% solution) and 2-Methyl-4-isothiazolin-3-one (2.5% solution) (ACTICIDE ® MBS-Thor Specialties) | Preservative | 5.0% |
| Propylene Glycol Butyl Ether (DOWANOL ™ PnB Glycol Ether-Dow Chemical) | Cleaning Solvent | 50.0% |

-continued

| | | |
|---|---|---|
| Propylene Glycol Methyl Ether (DOWANOL ™ PM-Dow Chemical) | Cleaning Solvent | 30.0% |
| Monoethanolamine from Dow Chemical | pH Control Agent | 2.5% |
| Sodium Laureth Sulfate-70% active (TEXAPON ® N70 NA-BASF) | Surfactant | 7.5% |
| LIQUITINT ® Skyblue (Milliken) diluted to 1.0% solution | Colorant | 1.5% |
| Fragrance | Fragrance | 0.5% |
| Total | | 100% |

Example 4

Concentrated Glass Cleaner Composition Packet/Pouch—4—this Example does not Use Preservative and Allows for More Anionic Surfactant while Maintaining Appropriate Moisture Content for Film Stability

| | | |
|---|---|---|
| DI water | Water | 5.00% |
| Propylene Glycol Butyl Ether (DOWANOL ™ PnB Glycol Ether-Dow Chemical) | Cleaning Solvent | 50.00% |
| Propylene Glycol Methyl Ether (DOWANOL ™ PM-Dow Chemical) | Cleaning Solvent | 30.00% |
| Monoethanolamine from Dow Chemical | pH Control Agent | 2.50% |
| Sodium Laureth Sulfate-70% active (TEXAPON ® N70 NA-BASF) | Surfactant | 12.50% |
| Total | | 100.00% |

In this case a preservative for long term storage is not incorporated into the product—this may be appropriate for designing for additional safety as a concentrate and for single use applications when the diluted product is to completely consumed immediately after it is prepared.

Example 5—this Example, while not without VOCs, has a Higher Flash Point to the Mixture than Some Prior Examples Concentrated Glass Cleaner Composition Packet/Pouch—5

| | | |
|---|---|---|
| Mixture of 1,2-Benzisothiazolin-3-one (2.5% solution) and 2-Methyl-4-isothiazolin-3-one (2.5% solution) (ACTICIDE ® MBS-Thor Specialties) | Preservative | 5.00% |
| Propylene Glycol Butyl Ether (DOWANOL ™ PnB Glycol Ether-Dow Chemical) | Cleaning Solvent | 59.00% |
| Ethylene Glycol Monohexyl Ether (Hexyl CELLOSOLVE ™ Solvent-Dow Chemical) | Cleaning Solvent | 23.2% |
| Monoethanolamine from Dow Chemical | pH Control Agent | 2.50% |
| Alkyl (C8-C16) Polyglucosides 50% solution (GLUCOPON ® 425-BASF) | Surfactant | 7.70% |
| Lauryl/Myristyl Glucoside 50% solution (GLUCOPON ® 600 UP-BASF) | Surfactant | 2.60% |
| Total | | 100.00% |

Example 6

Concentrated Glass Cleaner Composition Packet/Pouch—6

| | | |
|---|---|---|
| Mixture of 1,2-Benzisothiazolin-3-one (2.5% solution) and 2-Methyl-4-isothiazolin-3-one (2.5% solution) (ACTICIDE ® MBS-Thor Specialties) | Preservative | 5.00% |
| Propylene Glycol Butyl Ether (DOWANOL ™ PnB Glycol Ether-Dow Chemical) | Cleaning Solvent | 60.00% |
| Ethylene Glycol Monohexyl Ether (Hexyl CELLOSOLVE ™ Solvent-Dow Chemical) | Cleaning Solvent | 20.00% |
| Monoethanolamine from Dow Chemical | pH Control Agent | 3.00% |
| Sodium Laureth Sulfate-70% active (TEXAPON ® N70 NA-BASF) | Surfactant | 4.00% |
| Alkyl (C8-C16) Polyglucosides 50% solution (GLUCOPON ® 425-BASF) | Surfactant | 4.00% |
| Lauramine oxide (AMMONYX ® LO-Stepan) | Surfactant | 4.00% |
| Total | | 100.00% |

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A unit dose glass cleaner concentrate product comprising from 5 grams to 50 grams of a concentrated glass cleaning composition encased in a water soluble film, the concentrated glass cleaning composition comprising a plurality of cleaning solvents, at least one surfactant, water, and at least one preservative; wherein:

the plurality of cleaning solvents comprises at least one safer cleaning solvent, a first glycol ether solvent, and a second glycol ether solvent, wherein the at least one safer cleaning solvent is selected from the group consisting of ethyl levulinate glycerol ketal, ethyl levulinate propylene glycol ketal, soybean oil methyl esters, canola oil methyl esters, butyl 3-hydroxybutyrate, gamma-valerolactone, 2-methytetrahydrofuran, cyclopentylmethylether, and combinations of these;

a weight percentage of the first glycol ether solvent is greater than or equal to 30 wt. % based on the total weight of the concentrated glass cleaning composition;

a weight percentage of the second glycol ether solvent is greater than or equal to 30 wt. % based on the total weight of the concentrated glass cleaning composition; and the total weight percentage of the plurality of cleaning solvents and the at least one surfactant, expressed on an anhydrous basis, is at least 75% of the weight of the unit dose glass cleaner concentrate product.

2. The unit dose glass cleaner concentrate product of claim 1, wherein the preservative is selected from the group consisting of methylchloroisothiazolinone, methylisothiazolinone, benzisothiazolinone, benzalkonium chloride, benzethonium chloride, benzoic acid or sodium benzoate, benzyl alcohol, choroxylenol, salicylic acid or its metal salt form, sorbic acid or its metal salt form, and combinations of these.

3. The unit dose glass cleaner concentrate product of claim 1, further comprising one or more alkaline chemicals, one or more pH control agents, or combinations of these.

4. The unit dose glass cleaner concentrate product of claim 1, further comprising one or more chelants, one or more chelating polymers, or combinations of these.

5. The unit dose glass cleaner concentrate product of claim 1, further comprising one or more dispersive polymers.

6. The unit dose glass cleaner concentrate product claim 1, further comprising at least one surface modification polymer.

7. The unit dose glass cleaner concentrate product of claim 1, further comprising at least one co-solvent, at least one surfactant augmenting agent, or combinations of these.

8. The unit dose glass cleaner concentrate product of claim 1, further comprising one or more dual functional solvents, one or a plurality of enzymes, one or more colorants, one or more fragrances, or combinations of these.

9. The unit dose glass cleaner concentrate product of claim 1, further comprising suspended solid particles which are suspended in the solvents, the suspended solid particles comprising one or more water soluble polymer additives, surfactants, chelants, preservatives, alkaline compounds, pH control agents, chelating polymers, dispersive polymers, or combinations of these.

10. The unit dose glass cleaner concentrate product of claim 9, further comprising one or more suspending agents, structuring agents, thickening agents or combinations of these, wherein the suspending agents, structuring agents, thickening agents or combinations of these improve suspension of the solid particles in the solvents.

11. The unit dose glass cleaner concentrate product of claim 1, where the surfactants in the concentrated glass cleaning composition comprise at least one amine oxide and at least one sodium alkyl ether sulfate.

12. The unit dose glass cleaner concentrate product of claim 1, wherein the concentrated glass cleaning composition comprises from 0.1 wt. % to 32.5 wt. % of the at least one surfactant based on the total weight of the concentrated glass cleaning composition.

13. The unit dose glass cleaner concentrate product of claim 1, wherein the concentrated glass cleaning composition comprises:

from 60 wt. % to 82.2 wt. % cleaning solvents based on the total weight of the concentrated glass cleaning composition; and from 0.1 wt. % to 32.5 wt. % surfactants based on the total weight of the concentrated glass cleaning composition.

14. The unit dose glass cleaner concentrate product of claim 13, further comprising one or more of the following constituents:

from 0.1 wt. % to 20 wt. % dual functional solvent;

from 0.1 wt. % to 30 wt. % pH control agents, alkaline compounds, or both;

from 0.1 wt. % to 20 wt. % chelants;

from 0.1 wt. % to 20 wt. % dispersive polymers;

from 0.1 wt. % to 20 wt. % surface modification polymers;

from 0.1 wt. % to 30 wt. % hydrotropes, coupling agents, or both; or combinations of these, wherein the weight percentages are based on the total weight of the concentrated glass cleaning composition.

15. The unit dose glass cleaner concentrate product of claim 1, wherein concentrated glass cleaning composition comprises up to 5 wt. % of water based on the total weight of the concentrated glass cleaning composition.

16. The unit dose glass cleaner concentrate product of claim 1, wherein the at least one preservative comprises 5 wt. % of the concentrated glass cleaning composition or wherein the total weight percentage of the plurality of cleaning solvents is 60% to 82.2% of the weight of the concentrated glass cleaning composition.

17. The unit dose glass cleaner concentrate product of claim 1, wherein the concentrated glass cleaning composition has an undiluted pH in the range of 10 to 12.5.

18. A unit dose glass cleaner concentrate product consisting of from 5 grams to 50 grams of a concentrated glass cleaning composition encased in a water soluble film, wherein the concentrated glass cleaning composition consists of:

greater than or equal to 30 wt. % of a first glycol ether solvent based on the total weight of the concentrated glass cleaning composition;

greater than or equal to 20 wt. % of a second glycol ether solvent based on the total weight of the concentrated glass cleaning composition;

at least one surfactant;

water;

at least one preservative; and optionally, at least one additive selected from the group consisting of a pH control agent, a chelant, a chelating polymer, a dispersive polymer, a surface modification polymer, an enzyme, a colorant, a fragrance, and combinations thereof.

19. A unit dose glass cleaner concentrate product comprising:

from 5 grams to 50 grams of a concentrated glass cleaning composition encased in a water soluble film, the concentrated glass cleaning composition comprising a plurality of cleaning solvents, at least one surfactant, water, and at least one preservative; wherein:

the plurality of cleaning solvents comprises at least one glycol ether solvent and at least one safer cleaning solvent selected from the group consisting of ethyl levulinate glycerol ketal, ethyl levulinate propylene glycol ketal, soybean oil methyl esters, canola oil methyl esters, butyl 3-hydroxybutyrate, gamma-valerolactone, 2 methytetrahydrofuran, cyclopentylmethylether, and combinations thereof;

a weight percentage of the at least one glycol ether solvent is greater than or equal to 30 wt. % based on the total weight of the concentrated glass cleaning composition;

a weight percentage of the water is less than 5 wt. % based on the total weight of the concentrated glass cleaning composition; and the total weight percentage of the plurality of cleaning solvents and surfactants, expressed on an anhydrous basis, is at least 75% of the weight of the unit dose glass cleaner concentrate product.

20. The unit dose glass cleaner concentrate product of claim 1, wherein the concentrated glass cleaning composition comprises from 0.1 wt. % to 20 wt. % of the at least one preservative based on the total weight of the concentrated glass cleaning composition.

* * * * *